United States Patent [19]
Hibi et al.

[11] Patent Number: 5,136,890
[45] Date of Patent: Aug. 11, 1992

[54] HYDRAULIC CONTROL SYSTEM FOR CONTINUOUSLY VARIABLE TRACTION ROLLER TRANSMISSION

[75] Inventors: Toshifumi Hibi; Yoshiaki Kato, both of Kanagawa, Japan

[73] Assignee: Nissan Motor Co., Ltd., Yokohama, Japan

[21] Appl. No.: 674,153

[22] Filed: Mar. 25, 1991

[30] Foreign Application Priority Data

Apr. 4, 1990 [JP] Japan ................................ 2-89626

[51] Int. Cl.⁵ .............................................. F16H 15/00
[52] U.S. Cl. ..................................... 74/190.5; 74/200
[58] Field of Search .............................. 74/190.5, 200

[56] References Cited

U.S. PATENT DOCUMENTS

| | | | |
|---|---|---|---|
| 3,327,545 | 6/1967 | Petty | 74/190.5 |
| 4,297,918 | 11/1981 | Perry | 74/190.5 X |
| 4,484,487 | 11/1984 | Kraus | 74/200 |
| 4,718,294 | 1/1988 | Okoshi | 74/190.5 |
| 4,830,578 | 5/1989 | Kraus | 74/190.5 X |
| 4,960,004 | 10/1990 | Hibi et al. | 74/190.5 X |

FOREIGN PATENT DOCUMENTS

| | | |
|---|---|---|
| 0172276 | 2/1986 | European Pat. Off. |
| 2578019 | 8/1986 | France |
| 63-92859 | 6/1988 | Japan |
| 1-122551 | 8/1989 | Japan |

OTHER PUBLICATIONS

Patent Abstract of Japan vol. 10, No. 307 (M-527)(2363) Oct. 18, 1986, of JA-A-61 119 866 (Daihatsu) Jun. 7, 1986.

*Primary Examiner*—Allan D. Herrmann
*Assistant Examiner*—David W. Laub
*Attorney, Agent, or Firm*—Foley & Lardner

[57] ABSTRACT

A hydraulic control system for a continuously variable traction roller transmission comprises a shift control valve for controlling hydraulic pressure within a hydraulic cylinder apparatus. The shift control valve includes a sleeve and a spool received therein for relative motion, which assume a normal state when a gear ratio commanded corresponds to a rotational displacement of rotation shanks of roller support members wherein the hydraulic cylinder apparatus provides a predetermined force to the rotation shanks in an axial direction thereof so as to preserve a rotational displacement of the rotation shanks. The sleeve has a plurality of bores for discharging hydraulic fluid to be supplied to the hydraulic cylinder apparatus. The bores are fluidly communicated when a relative displacement between the sleeve and the spool with regard to the normal state is greater than a predetermined value, whereas the bores fail to be fluidly communicated when the relative displacement is smaller than the predetermined value.

6 Claims, 7 Drawing Sheets

HYDRAULIC CONTROL SYSTEM FOR CONTINUOUSLY VARIABLE TRACTION ROLLER TRANSMISSION

BACKGROUND OF THE INVENTION

The present invention relates to a hydraulic control system for a continuously variable traction roller transmission.

One of hydraulic control systems is disclosed, for example, in JP-U 63-92859. In this reference, a continuously variable traction roller transmission includes an input disc, an output disc, a pair of traction rollers disposed between a toroidal concavity defined by the two discs for frictional engagement therewith, and a pair of roller support members for rotatably supporting the traction rollers. Each of the roller support members being rotatable on a rotation shank which crosses a rotation axis of the two discs at right angles, and movable in an axial direction of the rotation shank. The transmission further includes a hydraulic cylinder apparatus for urging the roller support members to move in the axial direction of the rotation shank, a shift control valve for controlling hydraulic pressure to be supplied to the hydraulic cylinder apparatus, and a cam for transmitting rotational motion of the roller support members to the shift control valve. Inclination of each traction roller is adjusted by regulating an axial position of that roller support member by the hydraulic cylinder apparatus, thus continuously changing the gear ratio established between the input and output discs. A part of hydraulic fluid to be supplied to the hydraulic cylinder apparatus is always discharged through a hydraulic passage assuming orifice effect. Discharged hydraulic fluid is used for lubrication of frictional portions between the traction rollers and the two discs. Constantly discharging hydraulic fluid within the hydraulic cylinder apparatus through the orifice provides a damping effect upon shifting. That is, when the shift control valve operates based on a quick shifting command, hydraulic pressure within the hydraulic cylinder apparatus changes quickly, and a piston thereof responds quickly to this change, resulting in rotation of the roller support members. Since this rotation is fed back to the shift control valve through the cam, hunting may occur unless the hydraulic control system assumes a damping effect. With this transmission system, a part of hydraulic fluid within the hydraulic cylinder apparatus is always discharged as described above, thereby creating a slow rate of change of the hydraulic pressure within the hydraulic cylinder apparatus, and preventing the occurrence of hunting.

With such a hydraulic control system for a continuously variable traction roller transmission, however, since a part of hydraulic fluid within the hydraulic cylinder apparatus is always discharged, high pressure hydraulic fluid is consumed in quantity, resulting in a shortage of pump capacity. If the pump size is increased to secure the required oil quantity, the entire transmission will have to be enlarged in size.

SUMMARY OF THE INVENTION

It is, therefore, an object of the present invention to provide a hydraulic control system for a continuously variable traction roller transmission which effectively prevents the occurrence of hunting during shifting using only a small consumption of hydraulic fluid and a decreased pump size.

According to one aspect of the present invention, there is provided a hydraulic control system for a continuously variable traction roller transmission having at least one pair of roller support members for rotatably supporting at least one pair traction rollers, each being rotatable on a rotation shank and movable in an axial direction thereof, and a hydraulic cylinder apparatus for urging to move the roller support members in the axial direction of the rotation shank, the system comprising:

shift control valve means for controlling hydraulic pressure within the hydraulic cylinder apparatus, said shift control valve means including a sleeve and a spool received therein for relative motion, one of said sleeve and said spool being axially positioned in accordance with a gear ratio commanded and the other of said sleeve and said spool being axially positioned in accordance with a rotational displacement of the rotation shanks, said sleeve and said spool assuming a normal state when said commanded gear ratio corresponds to said rotational displacement of the rotation shanks wherein the hydraulic cylinder apparatus provides a predetermined force to the rotation shanks in the axial direction thereof so as to preserve said rotational displacement of the rotation shanks; and hydraulic passage means for discharging hydraulic fluid to be supplied to the hydraulic cylinder apparatus, said hydraulic passage means being in fluid communication when a relative displacement between said sleeve and said spool with regard to said normal state is greater than a predetermined value, said hydraulic passage means failing to be in fluid communication when said relative displacement is smaller than said predetermined value.

According to another aspect of the present invention, there is provided a continuously variable traction roller transmission comprising:

input and output discs;

at least one pair of traction rollers disposed between a toroidal concavity defined by said input and output discs for frictional engagement therewith;

at least one pair of roller support members so constructed and arranged as to rotatably support said traction rollers, each being rotatable on a rotation shank and movable in an axial direction thereof;

a hydraulic cylinder apparatus so constructed and arranged as to urge to move said roller support members in said axial direction of said rotation shanks; and shift control valve means for controlling hydraulic pressure within said hydraulic cylinder apparatus, said shift control valve means including a sleeve and a spool received therein for relative motion, one of said sleeve and said spool being axially positioned in accordance with a gear ratio commanded and the other of said sleeve and said spool being axially positioned in accordance with a rotational displacement of said rotation shanks, said sleeve and said spool assuming a normal state when said commanded gear ratio corresponds to said rotational displacement of said rotation shanks wherein said hydraulic cylinder apparatus provides a predetermined force to said rotation shanks in said axial direction of said rotation shanks so as to preserve said rotational displacement thereof; and hydraulic passage means for discharging hydraulic fluid to be supplied to said hydraulic cylinder apparatus, said hydraulic passage means being in fluid communication when a relative displacement between said sleeve and said spool with regard to said normal state is greater than a predetermined value, said hydraulic passage means failing to be in fluid communication when said relative displacement is smaller than said predetermined value.

BRIEF DESCRIPTION OF THE INVENTION

DETAILED DESCRIPTION OF THE INVENTION

Figure 5:
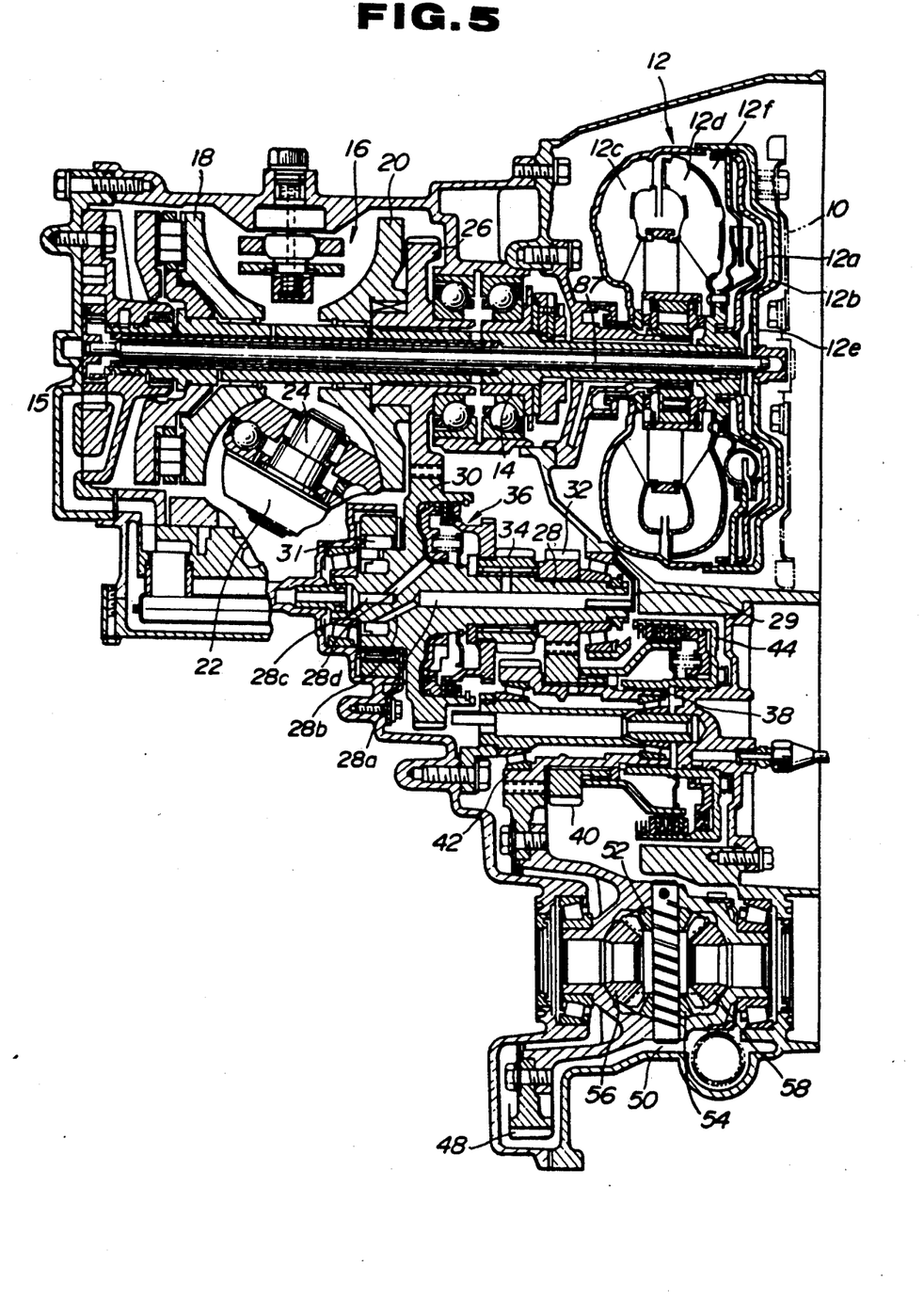
FIG. 5 is a view similar to FIG. 3, illustrating the entirety of a continuously variable traction roller transmission.

Referring to FIG. 5, a continuously variable traction roller transmission includes a torque converter 12 which is connected to a drive plate 10 formed with an input shaft of an engine. The torque converter 12, which includes a lock-up clutch 12a, can establish mechanical connection or disconnection between a pump impeller 12c on the input side and a turbine runner 12d on the output side by controlling hydraulic pressure within hydraulic chambers 12b and 12f. The torque converter 12 has a cover 12e to which an oil pump drive shaft 87 is connected. Drivingly connected to the drive shaft 87 is an oil pump 15 which is arranged opposite to the torque converter 12 with respect to a continuously variable traction roller transmission unit 16 which will be described hereinafter. The turbine runner 12d of the torque converter 12 is connected to a hollow input shaft 14. The continuously variable traction roller transmission unit 16 is connected thereto, and includes an input disc 18, an output disc 20, and a pair of traction rollers 22 arranged for transmitting torque therebetween. The input and output discs 18 and 20 have toroidal surfaces to engage with the traction rollers 22. Each of the traction rollers 22 includes a shaft 24 which assumes an inclination adjustable by a mechanism which will be described hereinafter in connection with FIGS. 6 and 7. The input disc 18 is connected to the input shaft 14, and the output disc 20 is formed with a gear 26 for unitary rotation. The gear 26 is engaged with a gear 30 which is formed with one idler shaft 28. A gear 32 is mounted to the idler shaft 28 for unitary rotation, and a gear 34 is rotatably supported thereto. By a reverse clutch 36, the gear 34 is connectable with the gear 30 for unitary rotation. A one-way clutch 31 is mounted to a casing to rotate the idler gear shaft 28 only in a forward direction, and fail to rotate in an opposite direction. This is a disposition for preventing the continuously variable traction roller transmission unit 16 from rotating in a direction opposite to that of engine rotation due to counter driving force from road wheels. Another idler shaft 38 is arranged in parallel to the idler shaft 28. A gear 40 is rotatably supported to the idler shaft 38, and a gear 42 is connected thereto for unitary rotation. By a forward clutch 44, the gear 40 is connectable with the idler shaft 38 for unitary rotation. The gear 40 is engaged with the gear 32, whereas the gear 44 is directly engaged with a final gear 48. Additionally, the gear 42 is always engaged with the final gear 48. A pair of pinion gears 52 and 54 which constitute a differential gear 50 are mounted thereto, and engaged with a pair of side gears 56 and 58 which are in turn engaged with an output shaft. With such a structure, when the engagement of the forward clutch 44 is made, the output shaft rotates in the forward direction, whereas when the engagement of the reverse clutch 36 is made, the output shaft rotates in the reverse direction. Additionally, a gear ratio is continuously changeable by controlling a contact state of the traction rollers 22 with the input and output discs 18 and 20.

Figure 6:
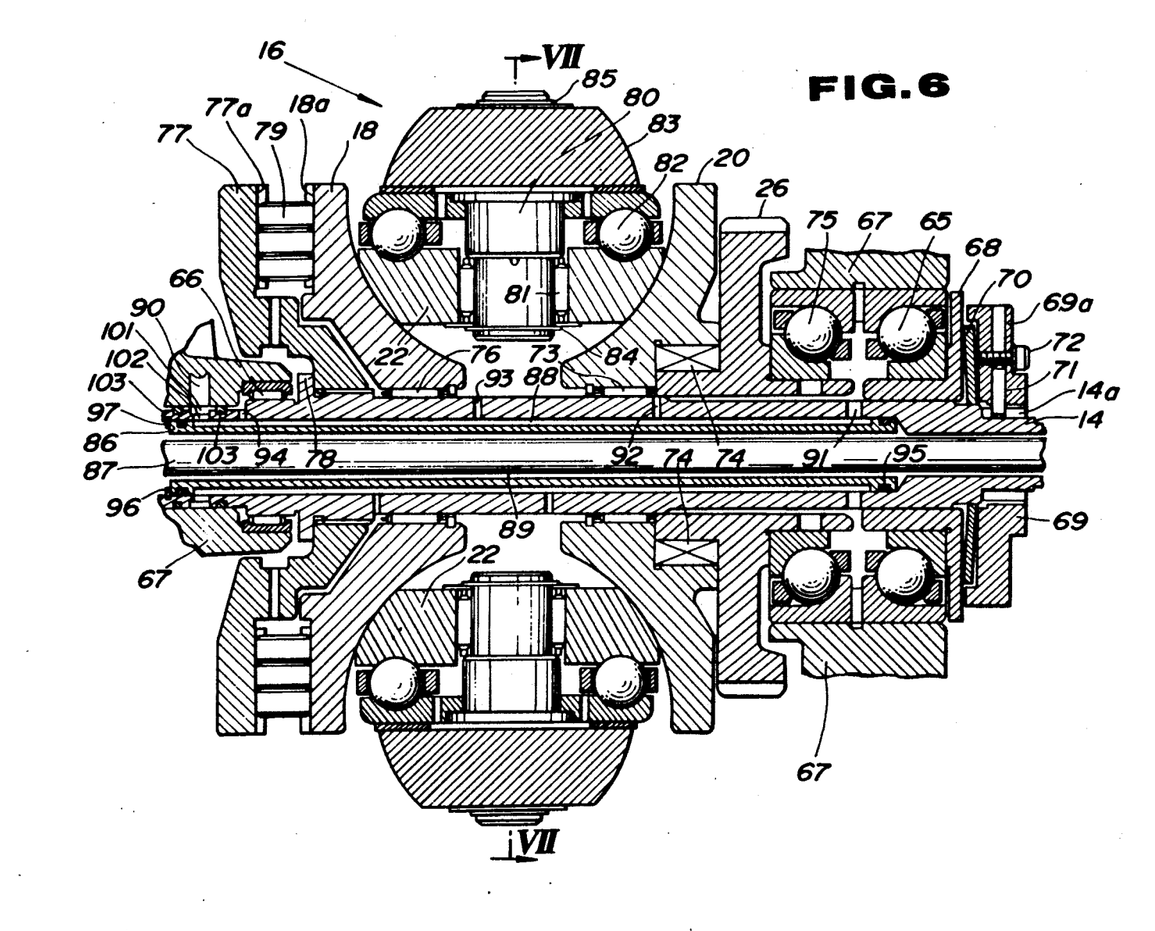
FIG. 6 is a view similar to FIG. 5, illustrating a continuously variable traction roller transmission unit.

Referring to FIG. 6, the input shaft 14 which the continuously variable traction roller transmission unit 16 is connected to is rotatably supported to a casing 67 through a ball bearing 65 and a needle bearing 66. A spacer 68 is arranged between the input shaft 14 and the ball bearing 65. A disc spring 70 is arranged between the spacer 68 and a loading nut 69 which is meshed with the input shaft 14 so as to bias the input shaft 14 rightward as viewed in FIG. 6. The loading nut 69 is locked by a pin 71 having one end received in one of grooves 14a of the input shaft 14. Since the loading nut 69 has a plurality of bores 69a for receiving the pin 71, and the input shaft 14 has a plurality of grooves 14a, a combination of the two allows a fine adjustment of the fixing position of the loading nut 69. The pin 71 is locked by a screw 72. Rotatably supported to the input shaft 14 through a bearing 73 is the output shaft 20 to which an output gear 26 is mounted for unitary rotation though two keys 74 disposed at symmetrical positions. The gear 26 is supported to the casing through a ball bearing 75. The input disc 18 is supported to the input shaft 14 through a bearing 76 in a rotatable and axially movable manner. A cam flange 77 is arranged on the back side of the input disc 18, viz., on the side not opposite to the output disc 20, and it is splined to the input shaft 14, and inhibited from making a leftward motion as viewed in FIG. 6 by a shoulder 78 of the input shaft 14. A cam roller 79 is arranged between cam surfaces 18a and 77a of the input disc 18 and the cam flange 77 respectively, which are opposite to each other. The cam surfaces 18a and 77a, and the cam roller 79 are so shaped as to generate a force to press the input disc 18 rightward as viewed in FIG. 6 when the cam flange 77 rotates relative to the input disc 18. Each of the traction rollers 22, which is disposed in a toroidal concavity defined by surfaces of the input and output discs 18 and 20 which are opposite to each other, is rotatably supported to a shaft 80 through a bearing 81. Additionally, the traction roller 22 is supported in a thrust direction thereof by ball bearings 82 which are in turn supported by a roller support member 83. The traction roller 22, the ball bearings 82, and the roller support members 83 are locked by snap rings 84 and 85 arranged at both ends of the shaft 80. Insertedly mounted in the inside diameter portion of the input shaft 14 is a sleeve 86 which is locked by a snap ring 97. Except for two end portions having O-rings 96 and 95, respectively, the diameter of the sleeve 86 is smaller than the inside diameter of the input shaft 14. An annular clearance as defined between the two serves as a hydraulic passage 88. The input shaft 14 has bores 94, 93, 92 and 91 which are formed in a radial direction thereof for fluid communication with the hydraulic passage 88. Additionally, the input shaft 14 has a groove 101, and a bore 102 for receiving hydraulic fluid from a bore 90 of the casing 67. The groove 101 is sealed by a seal ring 103. The oil pump drive shaft 87 is insertedly mounted in the inside diameter portion of the sleeve 86. An annular clearance as defined between the inside diameter portion of the sleeve 86 and the outside diameter portion of the oil pump drive shaft 87 serves as a hydraulic passage 89 for a hydraulic pressure for lockup control of the torque converter 12.

Figure 4:
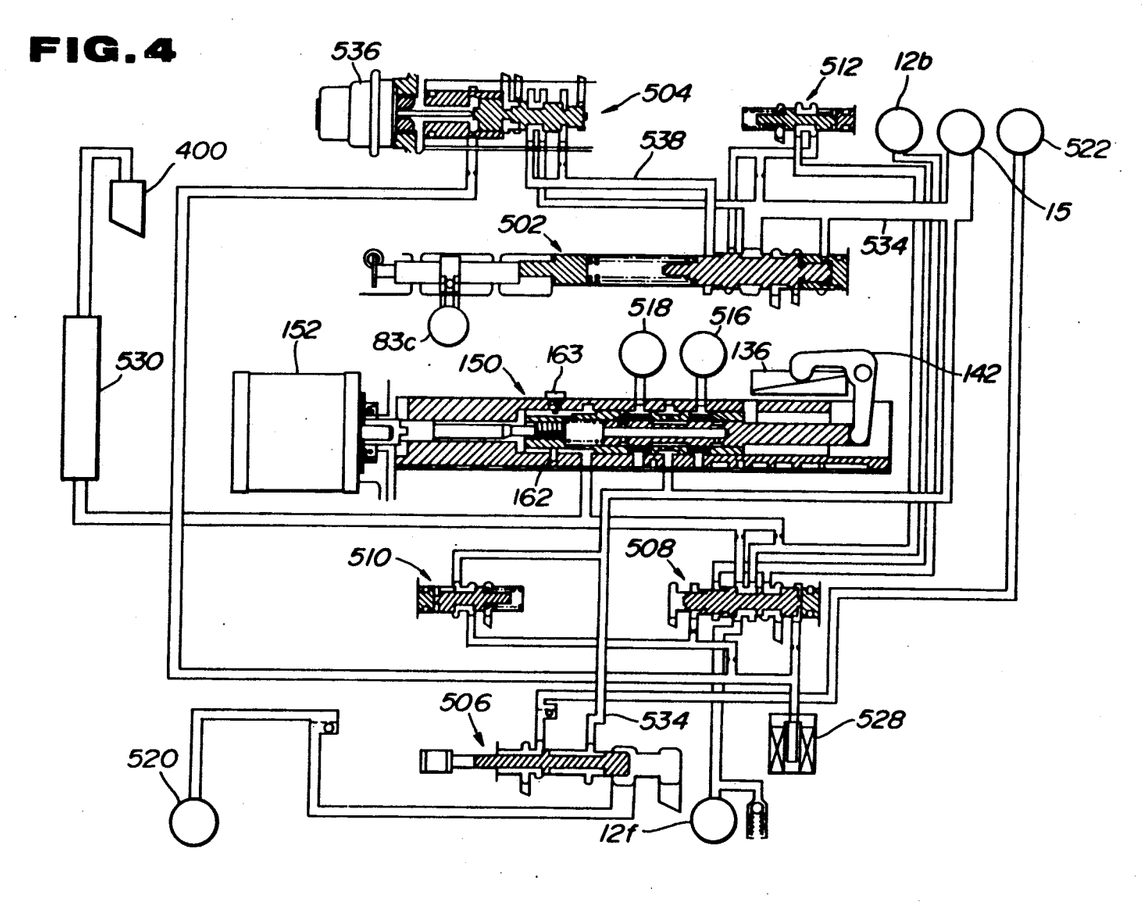
FIG. 4 is a schematic view illustrating a hydraulic control circuit.
Figure 7:
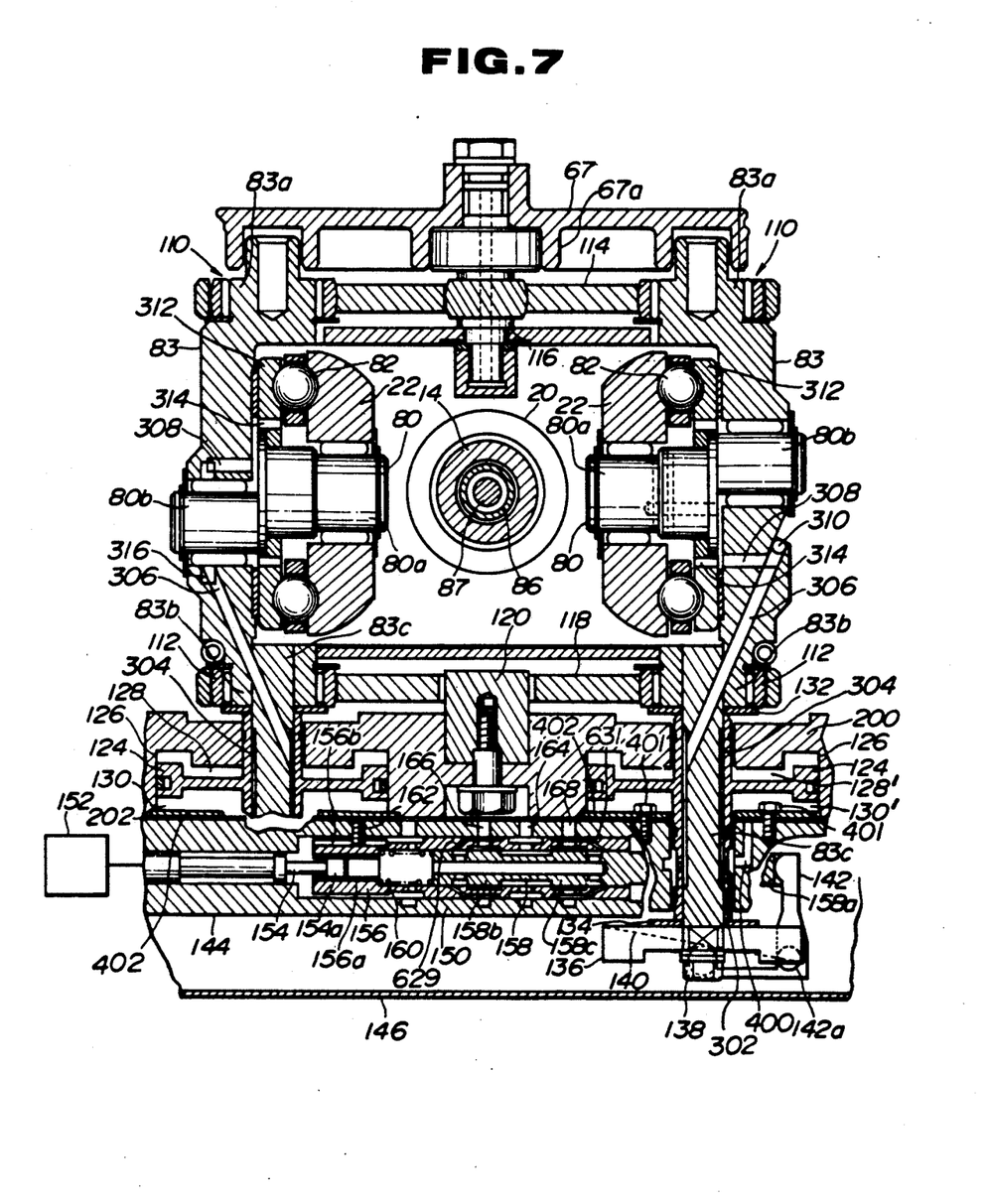
FIG. 7 is a view similar to FIG. 6, taken along the line VII—VII of FIG. 6.

Referring to FIG. 7, the roller support member 83 on the right side as viewed in FIG. 7 has rotation shank 83a and 83b, and is supported thereat by spherical bearings 110 and 112 in a rotatable and vertically movable manner. The spherical bearing 110 is supported by a bearing support member 114 which is in turn supported by a ring post 116 fixed to the casing 67. Also, the spherical bearing 112 is supported by a bearing support member 118 which is in turn supported by a ring post 120 fixed to an upper control valve body 200. The upper control valve body 200 is mounted to the casing 67. The roller support member 83 has an extension shank 83c which is concentric with the rotation shank 83b, and is a member integrally fixed thereto. A piston 124 is arranged at the outer periphery of the extension shank 83c, and received in a cylinder 126 which is formed in the upper control valve body 200. Thus, a part of a hydraulic chamber 128' is formed above the piston 124, whereas a part of a separate hydraulic chamber 130' is formed below the piston 124 as viewed on the right side of FIG. 7. Correspondingly, when viewing the left side of FIG. 7, a part of a hydraulic chamber 128 is formed above piston 124 and a part of a separate hydraulic chamber 130 is formed below the piston 124. A hydraulic cylinder apparatus is defined by the cylinder 126 and the piston 124 which urges the rotation shank 83b in an axial direction thereof. Through a bore 302 of the piston 124, a clearance 304 between the piston 124 and the small diameter portion of the extension shank 83c, and bores 306 and 308 of the roller support member 83, a lubricating circuit 400 of a lower control valve body 144 fluidly communicates with an opening of the bore 308. The bore 306 has an opening closed by a ball 310. A race 312 of the bearing 82 has a bore 314. The roller support member 83 on the left side as viewed in FIG. 7 has substantially the same hydraulic passages as the roller support member 83 on the right side as viewed in FIG. 7, viz., the clearance 304, and the bores 306 and 308. The two bores 306 and 308 are fluidly communicated with each other through an annular groove 316. The piston 124 is in contact with the roller support member 83 at the upper end thereof through a spacer 132, whereas it is in contact with a cam 136 at the lower end thereof through a spacer 134. The cam 136 is mounted to the extension shank 83c for unitary rotation by a bolt 138. It is to be noted that the cam 136 is mounted to only the extension shank 83c on the right side as viewed in FIG. 7, and not mounted to the extension shank 83c on the left side as viewed in FIG. 7. Except for this, the two traction rollers 22, and the two roller support members 83 are substantially symmetrical. The shaft 80 has a portion 80a for supporting the traction roller 22, and a portion 80b to be supported by the roller support member 83, which are eccentric with each other. The cam 136 has a bevel 140 with which a link 142 is in contact. Thus, the link 142 is swingably movable by rotation of the cam 136. The lower control valve body 144 is mounted to the upper control valve body 200 at the lower surface thereof through a separate plate 202. An oil pan 146 is mounted to the casing 67 so as to receive the lower control valve body 144, the cam 136, and the like. A keep plate 402 is secured to the lower control valve body 144 by bolts 401 so as to prevent the separate plate 202 from deforming toward the cylinder 126. A lower control valve body 144 includes a shift control valve 150 which has a drive rod 154 to be rotated by a shift motor 152, a sleeve 156, a spool 158 received in the inside diameter portion of the sleeve 156, and a spring 160 for biasing the spool 158 rightward as viewed in FIG. 7. The drive rod 154 has at one end thereof an external multiple thread portion 154a, and is engaged with the sleeve 156 through an internal multiple thread portion 156a thereof. The sleeve 156 has an axial groove 156b, and a pin 162 as fixed to the lower control valve body 144 is received therein. Thus, the sleeve 156 is axially movable without rotation. The spool 158 has one end opposite to the other end in contact with the spring 160, which is biased to the link 142 by force of the spring 160. The spool 158 includes lands 158c and 158b which allow an adjustment of an opening degree of ports which communicate with hydraulic passages 166 and 168, respectively. In a normal state, the spool 158 always stays at a predetermined axial position as indicated in FIG. 7 so as to supply the hydraulic passages 166 and 168 with hydraulic fluid having the same pressure. On the other hand, in a unstable state during a shifting, the spool 158 is changed in axial position to distribute line pressure supplied from the hydraulic passage 164 to the hydraulic passages 166 and 168. The hydraulic passage 168 is fluidly connected to the part of the hydraulic chamber 128' on the right side as viewed in FIG. 7, and the part of the hydraulic chamber 130 as viewed on the left side in FIG. 7. The hydraulic chamber parts 130 and 128' constitute a high-pressure side hydraulic chamber 516 as indicated in FIG. 4. The hydraulic chamber 166 is fluidly connected to the hydraulic chamber part 130' on the right side as viewed in FIG. 7, and the hydraulic chamber part 128 on the left side as viewed in FIG. 7. The hydraulic chamber parts 128 and 130' constitute a low-pressure side hydraulic chamber 518 as indicated in FIG. 4.

Figure 1:
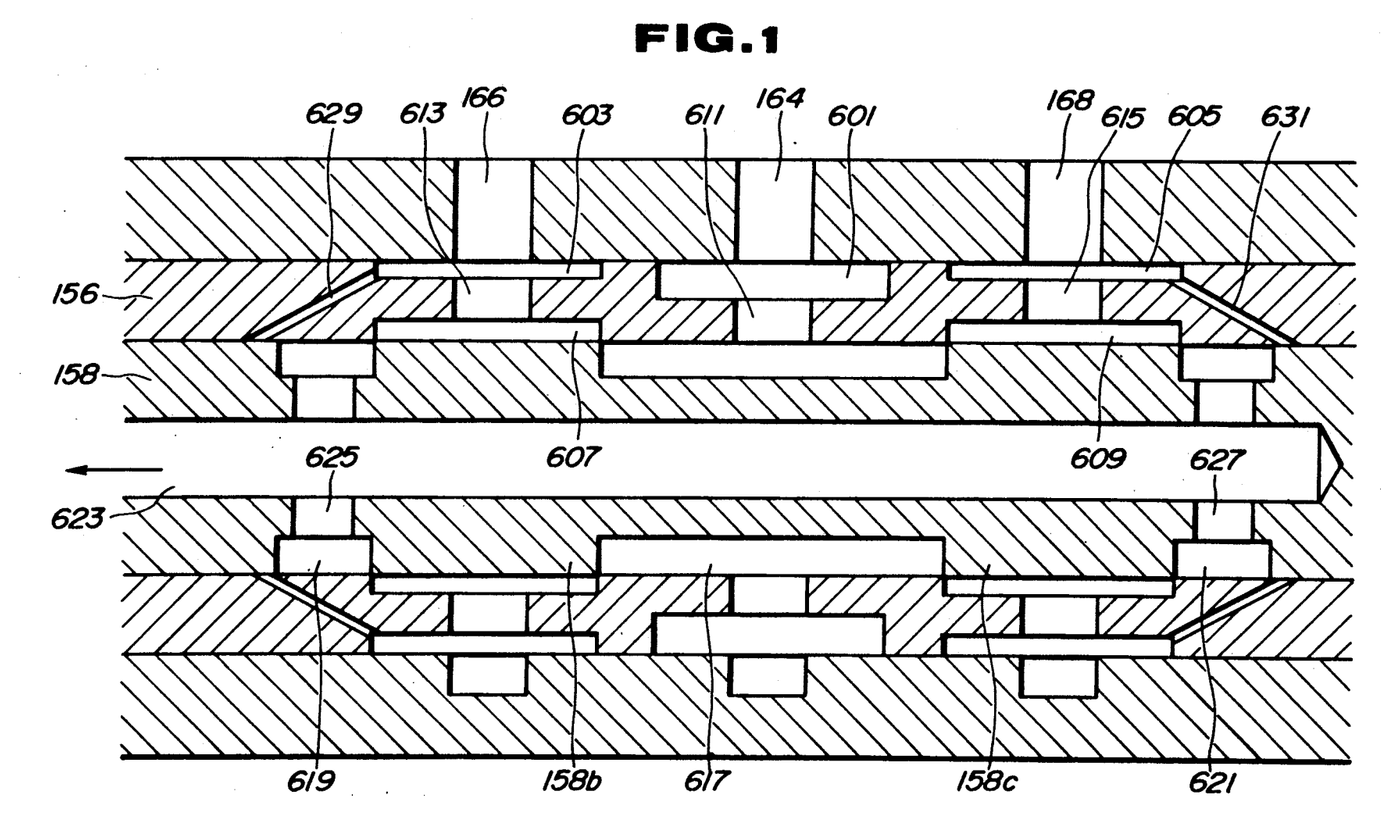
FIG. 1 is a sectional view illustrating a shift control valve which assumes a state without relative displacement between a sleeve and a spool.

Referring also to FIG. 1, a detailed description will be made with regard to the structure of the sleeve 156, and the spool 158. The sleeve 156 has at the outer periphery thereof annular grooves 601, 603, and 605 to correspond to the hydraulic passages 164, 166, and 168, respectively. Additionally, the sleeve 156 has at the inner periphery thereof annular grooves 607 and 609 to correspond to the lands 158b and 158c of the spool 158. The groove 601 fluidly communicates with the inside diameter portion of the sleeve 156 through a bore 611. Additionally, the grooves 603 and 607 are fluidly communicated with each other through a bore 613, whereas the grooves 605 and 609 are fluidly communicated with each other through a bore 615. The spool 158 has an annular groove 617, and grooves 619 and 621. The land 158b is positioned between the annular groove 617 and the groove 619, whereas the land 158c is positioned between the annular groove 617 and the groove 621. The spool 158 has an axial bore 623 for drainage at the center portion thereof. The grooves 619 and 621 fluidly communicate with the bore 623 through bores 625 and 627, respectively. The sleeve 156 has a small bore 629 which diagonally extends from the groove 603, and a small bore 631 which diagonally extends from the groove 605. In a normal state wherein the positions of the lands 158b and 158c correspond to same of the grooves 607 and 609, respectively, as indicated in FIG. 1, the bore 629 has on the inside diameter side thereof an opening which is inhibited from meeting the groove 619. Similarly, in the normal state, the bore 631 has on the inside diameter side thereof an opening which is inhibited from meeting the groove 621.

Referring to FIG. 4, a hydraulic control circuit includes the aforementioned shift control valve 150, a line pressure regulator valve 502, a throttle valve 504, a manual valve 506, a lock-up control valve 508, and constant pressure regulator valves 510 and 512, which are connected as indicated in FIG. 4. The hydraulic control circuit further includes the oil pump 15, the high-pressure or small gear ratio side hydraulic chamber 516 (which corresponds to the right and left hydraulic chambers 130 and 128 as indicated in FIG. 7), the low-pressure or large gear ratio side hydraulic chamber 518 (which corresponds to the right and left hydraulic chambers 128 and 130 as indicated in FIG. 7), the forward clutch 520, the reverse clutch 522, release side and apply side hydraulic chambers 12b and 12f of the torque converter 12, a solenoid 528, an oil cooler 530, and the lubricating circuit 400, which are connected as indicated in FIG. 4. The line pressure regulator valve 502 is arranged for adjusting hydraulic pressure or line pressure within the hydraulic passage 534 which receives discharge pressure from the oil pump 15. The throttle valve 504 is arranged for adjusting hydraulic pressure or throttle pressure in response to force of a vacuum diaphragm 536, and outputting it to the hydraulic passage 538. The shift control valve 150 is arranged for regulating the distribution of hydraulic pressure to the high-pressure side and low-pressure side hydraulic chambers 516 and 518 by operation of the shift motor 152, obtaining a predetermined gear ratio. The manual valve 506 is arranged for supplying the forward clutch 520 or the reverse clutch 522 with line pressure received from the hydraulic passage 534 in accordance with the position of a select lever, switching forward run to reverse run and vice versa. The lock-up control valve 508 is arranged for regulating hydraulic pressure within the hydraulic chambers 12b and 12f in accordance with hydraulic pressure obtained by the solenoid 528 which is controlled in duty ratio, controlling the engagement and disengagement of the lock-up clutch 12a. The constant pressure regulator valve 510 is arranged for adjusting constant pressure for use of the solenoid 528, whereas the constant pressure regulator valve 512 is arranged for adjusting hydraulic pressure supplied to the torque converter 12 within a predetermined value.

Next, the operation of this embodiment will be described. When the input shaft 14 is at a standstill, the disc spring 70 provides force or initial thrust to the input disc 18. With increase in rotational speed of the input shaft 14, the input disc 18 rotates with the cam flange 77 by operation of the cam roller 79, generating a thrust corresponding to input torque of the input shaft 14. Thus, the traction rollers 22, which are caught between the input and output discs 18 and 20, rotate without slippage, transmitting driving force from the input disc 18 to the output disc 20. By way of example, when shifting the gear ratio to the higher one, the drive rod 154 is rotated by the shift motor 152 so as to urge the sleeve 156 to move rightward as viewed in FIG. 1 by engagement of the external thread portion 154a of the drive rod 154 with the internal thread portion 156a of the sleeve 156. Since the spool 158 is not urge to move immediately, a relative positional relationship between the spool 158 and the sleeve 156 changes to decrease a clearance between the grooves 617 and 609 and passing from the hydraulic passage 164 to same 168, and increase a clearance between the grooves 617 and 607 and passing from the hydraulic passage 164 to same 166. As a result, hydraulic pressure within the hydraulic passage 168 decreases, whereas hydraulic pressure within the hydraulic passage 166 increases. Since hydraulic pressure within the hydraulic passage 166 is supplied to the right hydraulic chamber 130, and hydraulic pressure within the hydraulic passage 168 is supplied to the right hydraulic chamber 128, the right piston 124 undergoes force to urge to move upward as viewed in FIG. 7. On the other hand, since the left hydraulic chambers 128 and 130 are connected to the hydraulic passages 168 and 166 in a reverse manner to the right hydraulic chambers 128 and 130, the left piston 124 undergoes force to urge to move downward as viewed in FIG. 7. Thus, the right roller support member 83 shifts upward, whereas the left roller support member 83 shifts downward. This changes the direction of force which operates on the traction rollers 22 in a tangent direction, causing the right and left roller support members 83 to rotate on the respective rotation shanks 83a and 83b in a direction opposite each other. In that manner, the radius between the traction rollers 22 and the input disc 18 decreases, whereas the radius between the traction rollers 22 and the output disc 20 increases. That is, the gear ratio shifts to the higher one. Rotation of the roller support member 83 is transmitted to the cam 136 through the extension shank 83c. With rotation of the cam 136, the link 142 is urged to swingably move, shifting the end of the link 142 rightward as viewed in FIG. 7. Thus, the spool 158 is urged to move rightward as viewed in FIG. 7 by force of the spring 160. Finally, differential pressure between the hydraulic passages 168 and 166 stabilizes in providing axial force on the roller support member 83 so as to preserve the gear ratio commanded. This increases the gear ratio by a predetermined amount in accordance with rotation of the shift motor 152, and the increased gear ratio is preserved. When shifting the gear ratio to the lower one, the operation is substantially the same except that the shift motor 152 rotates in a reverse direction.

Figure 2:
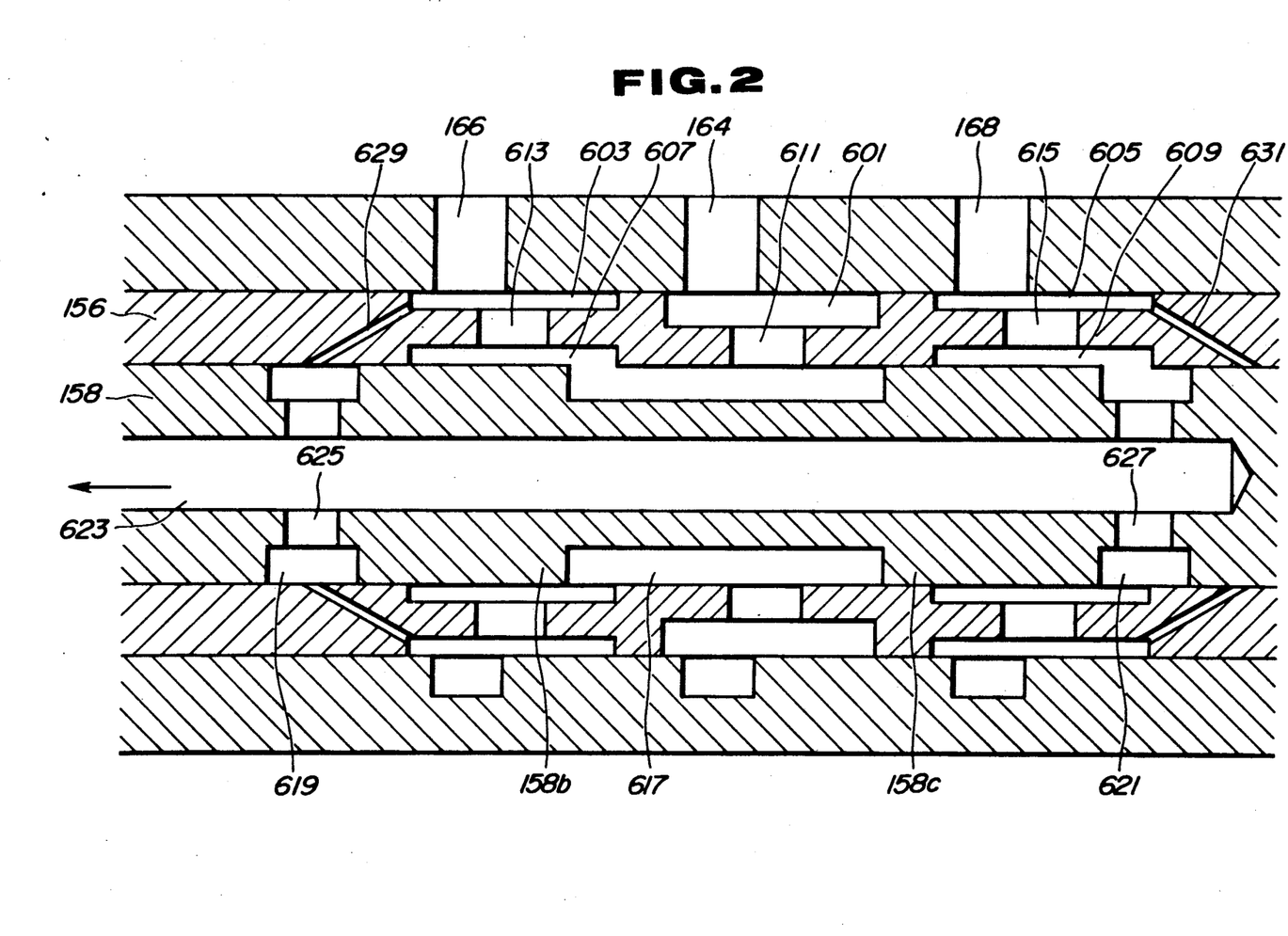
FIG. 2 is a view similar to FIG. 1, but with relative displacement between the sleeve and the spool.
Figure 3:
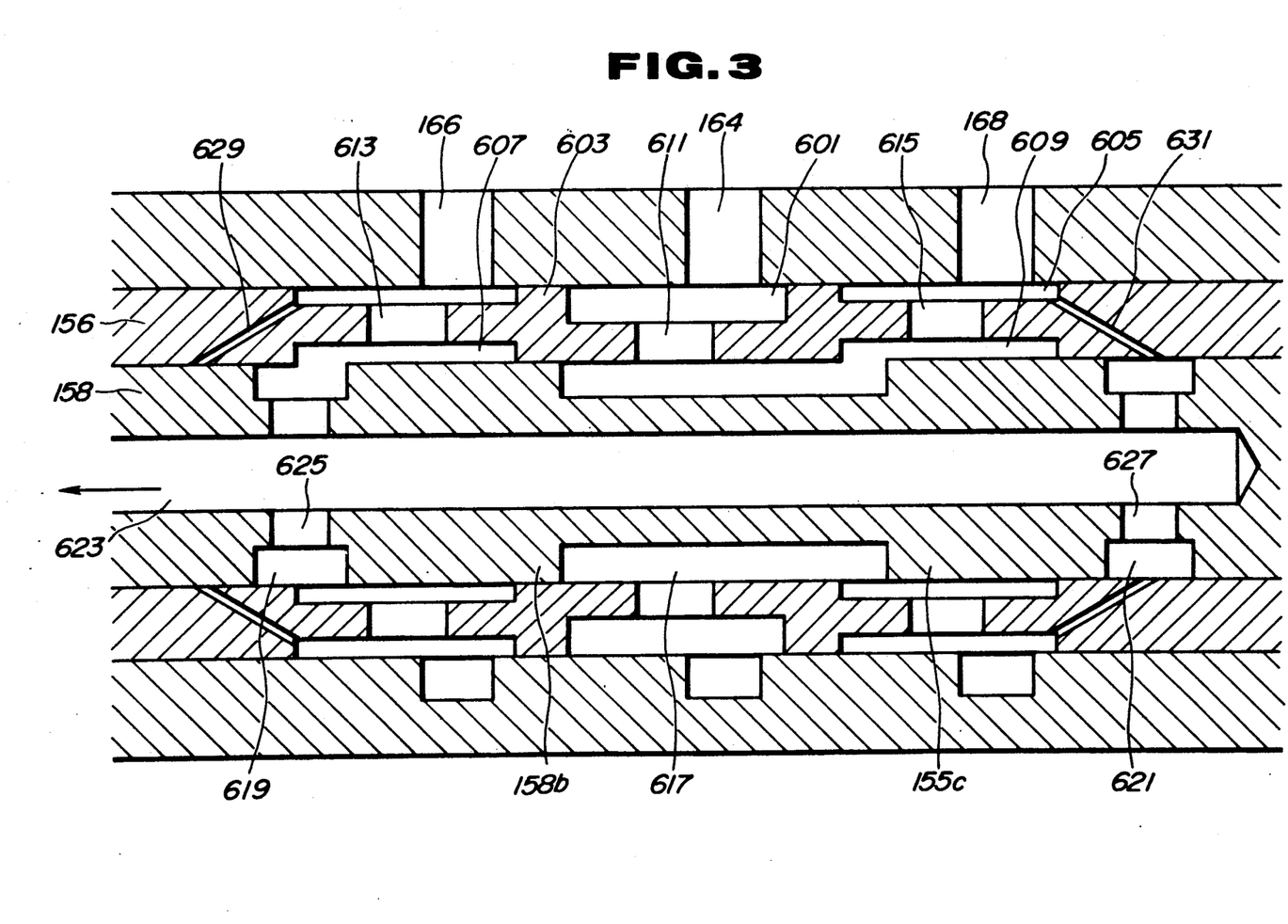
FIG. 3 is a view similar to FIG. 2, but with relative displacement in a direction opposite to that of FIG. 2.

Upon the shift operation as described above, hunting may not occur. That is, when the sleeve 156 is urged to move rightward as viewed in FIG. 1, the opening of the bore 629 on the inside diameter portion thereof meets the groove 619 as shown in FIG. 2. Thus, the groove 603 fluidly communicates with the groove 619 through the bore 629. The groove 619 is connected to the bore for drainage. Accordingly, hydraulic pressure as supplied from the hydraulic passage 166 to the low-pressure side hydraulic chamber 518 is partly discharged through the bore 629, restraining quick increase of the hydraulic pressure within the low-pressure side hydraulic chamber 518, producing damping effect. This prevents occurrence of hunting. Since the bore 629 is small in diameter to assume orifice effect, hydraulic pressure within the low-pressure side hydraulic chamber 518 may not decrease below a predetermined level. Since the opening of the bore 629 is closed as the spool 158 returns to the normal state, the discharge of hydraulic fluid is performed only upon shifting. Accordingly, hydraulic pressure may not leak out in the normal state as shown in FIG. 1. When the spool 158 is urged to move leftward as viewed in FIG. 1, the opening of the bore 631 on the inside diameter portion thereof meets the groove 619 as shown in FIG. 3, obtaining the same operation as described above.

Upon power transmission as described above, lubricating oil is supplied to a contact portion of the traction rollers 22 with the input and output discs 18 and 20. Specifically, with the right traction roller 22, for example, lubricating oil within the lubrication circuit 400 is supplied thereto passing through the bore 302, the clearance 304, the bore 306, and the bore 308, then flows around the traction roller 22 through the bore of the race 312 and the clearance between the bearing 82 and roller support members 83. Lubrication is thus performed to the contact portion of the right traction roller 22 with the input and output discs 18 and 20. Even if the contact state between the right traction roller 22 and the input and output discs 18 and 20 changes with rotational motion of the roller support member 83, sufficient lubrication is always assured due to unchanged positional relationship between the roller support member 83 and the right traction roller 22. With the left traction roller 22, lubrication is performed in a similar manner.

What is claimed is:

1. A hydraulic control system for a continuously variable traction roller transmission having at least one pair of roller support members for rotatably supporting at least one pair of traction rollers, each roller support member being rotatable on a rotation shank and movable in an axial direction thereof, and a hydraulic cylinder apparatus for urging the roller support members to move in the axial direction of the rotation shank, the system comprising:
   shift control valve means for controlling hydraulic pressure within the hydraulic cylinder apparatus, said shift control valve means including a sleeve and a spool received therein for relative motion therebetween, one of said sleeve and said spool being axially positioned in accordance with a gear ratio commanded and the other of said sleeve and said spool being axially positioned in accordance with a rotational displacement of the rotation shanks, said sleeve and said spool assuming a normal state when said gear ratio corresponds to said rotational displacement of the rotation shanks wherein the hydraulic cylinder apparatus provides a predetermined force to the rotation shanks in the axial direction thereof so as to preserve said rotational displacement of the rotation shanks;
   first hydraulic passage defining means for supplying hydraulic fluid to the hydraulic cylinder apparatus;
   second hydraulic passage defining means for discharging hydraulic fluid, said second hydraulic passage defining means being in fluid communication with said first hydraulic passage means; and
   third hydraulic passage defining means for discharging hydraulic fluid, said third hydraulic passage defining means being in fluid communication with said second hydraulic passage defining means when a relative displacement between said sleeve and said spool relative to said normal state is greater than a predetermined value and failing to be in fluid communication with said second hydraulic passage defining means when said relative displacement is smaller than said predetermined value.

2. A hydraulic control system as claimed in claim 1, wherein said second hydraulic passage defining means includes said sleeve of said shift control valve means.

3. A continuously variable traction roller transmission comprising:
   input and output discs;
   at least one pair of traction rollers disposed between a toroidial concavity defined by said input and output discs for frictional engagement therewith;
   at least one pair of roller support members so constructed and arranged as to rotatably support said at least one pair of traction rollers, each roller support member being rotatable on a rotation shank and movable in an axial direction thereof;
   a hydraulic cylinder apparatus so constructed and arranged as to urge at least one pair of said roller support members to move in said axial direction of said rotation shanks;
   shift control valve means for controlling hydraulic pressure within said hydraulic cylinder apparatus, said shift control valve means including a sleeve and a spool received therein for relative motion therebetween, one of said sleeve and said spool being axially positioned in accordance with a gear ratio commanded and the other of said sleeve and said spool being axially positioned in accordance with a rotational displacement of said rotation shanks, said sleeve and said spool assuming a normal state when said gear ratio corresponds to said rotational displacement of said rotation shanks wherein said hydraulic cylinder apparatus provides a predetermined force to said rotation shanks in said axial direction of said rotation shanks so as to preserve said rotational displacement thereof;
   first hydraulic passage defining means for supplying hydraulic fluid to the hydraulic cylinder apparatus;
   second hydraulic passage defining means for discharging hydraulic fluid, said second hydraulic passage defining means being in fluid communication with said first hydraulic passage means; and
   third hydraulic passage defining means for discharging hydraulic fluid, said third hydraulic passage defining means being in fluid communication with said second hydraulic passage defining means when a relative displacement between said sleeve and said spool relative to said normal state is greater than a predetermined value and failing to be in fluid communication with said second hydraulic passage defining means when said relative displacement is smaller than said predetermined value.

4. A hydraulic control system as claimed in claim 1, wherein said first hydraulic passage defining means includes a lower control valve body of said shift control valve means.

5. A hydraulic control system as claimed in claim 1, wherein said third hydraulic passage defining means includes said spool of said shift control valve means.

6. A hydraulic control system as claimed in claim 1, wherein when said third hydraulic passage defining means is in fluid communication with said second hydraulic passage defining means, hydraulic fluid is discharged via said third hydraulic passage defining means while hydraulic fluid is concurrently supplied to the hydraulic cylinder apparatus via the first hydraulic passage defining means.

* * * * *